Reissued Apr. 10, 1951 Re. 23,355

UNITED STATES PATENT OFFICE 23,355

MOLD COMPOSITION

Burgess P. Wallace, Brooklyn, N. Y., assignor to Whitehead Brothers Company, New York, N. Y., a corporation of New Jersey No Drawing. Original No. 2,469,907, dated May 10, 1949, Serial No. 692,377, August 22, 1946. Application for reissue January 30, 1950, Serial No. 141,359

3 Claims. (Cl. 22—188)

Matter enclosed in heavy brackets [ ] appears in the original patent but forms no part of this reissue specification; matter printed in italics indicates the additions made by reissue.

This invention relates to the expeditious and economical casting of high melting point, difficultly oxidizable metals, such as iron, steel, bronze and the like, in so-called reversible water-tempered green molds and has for its particular objects the production of pattern-true castings of such metals having mirror-like surfaces, free from blow holes, pits, scabs and particularly from burnt-on sand grains whereby, as a consequence, it is unnecessary to resort to costly and tedious tumbling, wire-brushing and sand-blasting operations in order to obtain high grade castings. Other objects of the invention are hereinafter set forth.

For generations, it has been the usual if not the universal practice in foundry operations, to cast grey iron and malleable iron, steel and bronze in molds formed of non-combustible refractory materials such as highly refractory grains of silica sand of varying degrees of fineness, naturally or artificially bonded with clays or with clay-like materials such as bentonite. In using such silica sand molds, however, one encounters a very serious difficulty in that the molten metal tends to fuse the bonding material both to the metal and to the sand grains in the surface of the mold with the consequence that rough castings will be obtained which are covered to a substantial depth by a layer of firmly adhering, burnt-on, fritted sand particles that require expensive equipment and considerable expenditure of time and effort to clean the same. Many different methods are employed in an effort to minimize such so-called burn-on of the sand particles but they all depend in the last analysis upon the interposition of a carbonaceous film having a limited refractory value between the said surface of the mold and the flowing metal. For example graphite is frequently slicked or patted on the sand surfaces of the mold and the sand particles are completely covered thereby. Again, it is a common practice to employ a dust-on type of carbonaceous facing which is dusted on to the cope and drag surfaces of the mold in an attempt to separate the sand particles in the mold surface from the molten metal and thereby protect them from the fusing action of such metal. In still other cases, finely divided sea coal or pitch is directly incorporated in the facing sand (the sand next to the metal of such sand molds) for the purpose of generating in situ in such surfaces an amount of soot and soot-laden hydrocarbons which tend to coat the surface sand particles and thus separate them from the molten metal. It is generally recognized that, regardless of which protective procedure is employed, unless a sufficiently thick layer of carbon is applied to the mold or generated in the surface thereof, the hot metal will burn its way through such layer and contact directly with the sand particles in the mold surface and a burn-on of the silica particles will result. Not only are such facings expensive and their application time-consuming but frequently the mold surfaces are disturbed during the application thereof and consequently pattern-true castings cannot be obtained.

In the preparation of the aforesaid green sand molds, it is essential to impart thereto a "green bond" strength capable of resisting disintegration or fracture during the formation thereof and especially during the removal of the patterns therefrom as well as during the initial pouring of the mold. In addition to such "green bond" strength, the mold must be capable of withstanding the erosive action of the molten metal and also be sufficiently refractory to preserve the dimensions of the mold cavities and the designs on the mold surfaces substantially unimpaired. These and other features are possessed by molds prepared in accordance with my invention as hereinafter set forth in detail.

My investigations have led to the discovery, that, contrary to the general belief that such refractory or incombustible materials, as above specified, are essential for forming metal-casting molds, that pattern-true castings far superior to those producible in sand molds can be obtained by the employment of molds composed substantially entirely, except for the indispensable bonding material, of combustible carbonaceous substances and containing no sand whatsoever. Furthermore that the castings produced in this latter type of mold are not only entirely free from burnt-on sand conditions on all of the faces thereof but such surfaces possess a mirror-like finish entirely free from all imperfections which is characteristic thereof and quite unlike any castings made in the aforesaid ordinary sand molds. Since there is no adhering sand on the castings so produced in my improved mold, they do not have to be cleaned at all as nothing will be found adhering thereto after the casting is cooled and shaken out of the mold. Furthermore the employment of this novel molding media completely eliminates the necessity of employing facing compositions such as aforesaid and the very absence of the same facilitates the production of faithful castings of extreme accuracy of pattern detail since nothing has been applied to the finished mold surfaces to distort the same.

Furthermore, since as is well known an excess of carbon produces a greater fluidity in grey iron, the metal runs more freely and iron castings produced in such molds have sharper detail than those produced in ordinary sand molds. Still another important factor resides in the fact that carbon has a very low coefficient of expansion and therefore complete molds made with such carbonaceous molding media do not expand or contract as much as sand molds and hence do not put strains on the metal as it solidifies with the result that virtually no tears or cracks are evident.

I am well aware that it has been heretofore proposed to produce molding material by grinding together a major proportion of coke and a minor proportion of graphite and to incorporate in the ground mixture a sufficient amount of a binder composed of hot pitch to render the resultant mixture of the consistency of mortar as used in brick-laying. The mixture so obtained was then enclosed in a suitable case and then heated in a furnace to a sufficient temperature and for a sufficient time to coke the binder and then, when the mass was cool it was pulverized to the consistency of molding sand. The resultant granular product was intended to be used in lieu of ordinary molding sand to form the desired mold. The mold thus formed when tempered with water has a very moderate green bond strength, since the water constitutes the only bonding medium and the green bond strength results solely from its capillarity. However, its hot bond strength is virtually nil as the water quickly evaporates when the mold is heated. These molds are therefore wholly unable to withstand the impact or erosive action of molten metal poured into such molds. As a consequence, due to such erosive action on the mold, it is impossible to produce pattern-true castings therein. Moreover, the synthetic molding material employed in such molds is substantially waterproofed by the melted pitch ingredient incorporated therein and consequently such molding material is ill adapted for tempering with water in accordance with the procedure usually employed in making green sand molds.

In the production of castings of ferrous metals, bronze and other difficultly oxidizable metals of relatively high melting points in accordance with my invention, it is preferable to proceed in accordance with either of the following two methods:

(1) Eighty parts of seventy-two (72) hour metallurgical coke, retort carbon, anthracite coal, graphite or like highly refractory carbonaceous material which, when heated to an average temperature of seven hundred twenty-five (725°) C. will not lose more than forty-five (45%) of carbon, is ground [until it has a grain fineness] *and selectively sized, in the well known manner, to a grain fineness number* between one hundred ninety (190) and two hundred (200) as determined by the Foundry Sand Grading Classification set forth in the Foundry Sand Testing Handbook, fifth edition, 1944, of the American Foundrymen's Association. To this ground material is added ten (10) parts of an inorganic clay-like bonding material, desirably bentonite or fire clay, and (3) parts of a gummy adhesive organic bonding material, as dextrine or gum arabic for example, the above materials being intimately mixed in a suitable mixer either while dry or in the presence of a small amount of water which latter tends to facilitate the more even distribution of the bonding materials throughout the mass. The resultant mixture constitutes a synthetic carbonaceous molding medium which is ready for shipment to foundries where it can be tempered with the correct amount of water and formed into molds in the identical manner at present employed when using silica molding sands.

In those cases where the prepared molds are to be used for the production of heavy castings, it is desirable to incorporate about ½ to three parts of a pitchy material, such as coal tar pitch, or sea coal in the above mixture in order to create a dense smoky atmosphere within the mold and to assist in freeing the clay-like bond from the casting.

(2) My second method comprises the preparation of a molding medium which is free from any clay-like or other inorganic bonding substance, whatsoever, the same being accomplished by admixing with the aforesaid carbon base material about 3% to 8% by weight thereof of an organic, adhesive, water-soluble bonding substance, such as dextrine or gum arabic or some ½ to 10% of a water-soluble synthetic resin, desirably of the citro-glycerol type. There being no inorganic ingredient in such a mixture, it is obviously unnecessary to incorporate any pitch-like material with such base, even when producing heavy castings.

The amount of the clay-like bonding substance employed should be between five and thirty percent by weight, of the finished molding material when the same is employed at all and preferably the amount of the gummy adhesive bonding substance admixed with the clay-like bonding substance should be between 2% and 8% by weight of the finished molding material, although the same can be dispensed with entirely if not readily available when the clay-like bonding material is employed.

The carbon ingredient of the molding material should have a refractory value substantially greater than that of a good grade of charcoal and the bentonite and gummy bonding agent should be preferably as finely divided as the carbonaceous material that is employed.

Instead of making a complete mold of the aforesaid novel molding material, a mold can be formed from ordinary molding sand except for the surface layer, say about ¼ to ½ inch in depth which can be formed from said novel molding medium as such a facing will when tempered with water act exactly like the molding sand to the rear of it insofar as its moldability is concerned and accordingly will firmly adhere to the backing to form an effective protecting layer that will absolutely prevent any contact between the backing sand and the molten metal with the consequence that the casting obtained by pouring hot metal into the mold when finished will correspond in every way to that obtainable by pouring hot molten metal into a mold formed entirely of my improved sand-free molding material.

Due to the presence of the bentonite or other clay-like or gummy bonding substance in my improved molding material, a molder's floor heap thereof will not dry out during the working day as would be the case were the tempering water, only, to be relied upon as aforesaid to bond the material. Again, my novel molding material can, just as in the case of ordinary molding sand be used over and over again merely by adding additional bond to compensate for that rendered inactive in order to re-generate the molding material.

By the employment of my improved molding material, it is possible to realize all of the aforesaid advantages which were the objects of the invention while at the same time molds can be formed with the same facility and in the same manner as if ordinary molding sand was being employed and likewise the grain sizes of my carbon base material can be selected to correspond to the grain [sizes] *fineness number* of molding sands which had been previously employed in a foundry desiring to use this new molding material, such [sizes] grain *fineness number* usually ranging from about 50 to 250 on the scale set forth in the said *Foundry Sand* grading classification.

While I have described certain preferred embodiments of my invention, various modifications thereof within the scope of the appended claims may be made without departing from the spirit of my invention.

Having thus described my invention, what I claim is:

*1.* An unbaked green mold for casting difficultly oxidizable metals, consisting essentially of grains of highly refractory carbon of *a* pre-selected grain [sizes] *fineness number* and between about 50 and 250 on *the* scale set forth in the Foundry Sand Grading Classification *in the Foundry Sand Testing Handbook, Fifth edition (1944)*, of the American Foundrymen's Association, and containing a minor proportion, but at least about 5%, of bentonite intimately incorporated therewith and also between about 2% and 8% of an organic gummy adhesive [belonging to] *selected from* the group consisting of dextrine and gum arabic, said mold having excellent "green bond" strength whereby the same is rendered capable of resisting disintegration or fracture during the formation thereof and especially during the removal of a pattern therefrom as well as during the initial pouring of the mold, and also having excellent "hot strength," whereby the same is rendered capable of resisting the erosive action of the molten metal and of preserving designs on the mold surfaces substantially unimpaired; and said mold being essentially sand-free, at least to a depth of about one-quarter inch below the inner surface thereof.

*2. An unbaked green mold for metal casting purposes, consisting essentially, at least to a depth of about one-quarter inch below the inner surface thereof, of grains of refractory carbon of a pre-selected grain fineness number and between about 50 and 250 on the scale set forth in the Foundry Sand Grading Classification in the Foundry Sand Testing Handbook, Fifth edition (1944), of the American Foundrymen's Association and a minor proportion, at least about 5%, of a clay-like bond selected from the group consisting of bentonite and fire-clay, said mold having excellent "green bond" strength whereby the same is rendered capable of resisting disintegration or fracture during the formation thereof and especially during the removal of a pattern therefrom as well as during the initial pouring of the mold, and also having excellent "hot strength," whereby the same is rendered capable of resisting the erosive action of the molten metal and of preserving designs on the mold surfaces substantially unimpaired.*

*3. An un-baked green mold for metal-casting purposes as claimed in claim 2, containing from 2% to 8% of an organic, adhesive, water-soluble bonding substance.*

BURGESS P. WALLACE.

REFERENCES CITED

The following references are of record in the file of this patent:

UNITED STATES PATENTS

| Number | Name | Date |
|---|---|---|
| 2,299,860 | Stoody | Oct. 27, 1942 |
| 2,304,751 | Hake | Dec. 8, 1942 |

OTHER REFERENCES

Dietert, "Modern Core Practices and Theories," published 1942, pages 4–10, 16 and 42.